C. A. MURDOCK.
Cans.
No. 139,181. Patented May 20, 1873.
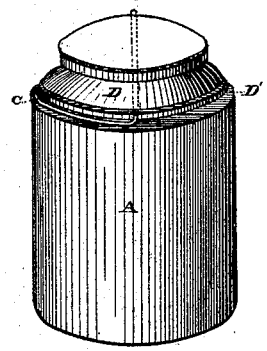
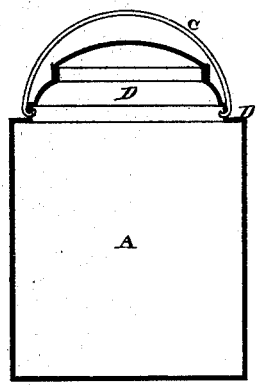
Witnesses.
L. H. Gano
W. G. Kendig.
Inventor.
Chas. A. Murdock
per
F. A. Lehmann, Atty

UNITED STATES PATENT OFFICE.

CHARLES A. MURDOCK, OF MILWAUKEE, WISCONSIN.

IMPROVEMENT IN CANS.

Specification forming part of Letters Patent No. 139,181, dated May 20, 1873; application filed February 10, 1873.

*To all whom it may concern:*

Be it known that I, CHARLES A. MURDOCK, of Milwaukee, in the county of Milwaukee and State of Wisconsin, have invented certain Improvements in Cans, of which the following is a specification:

Nature and Object of the Invention.

The nature of my invention relates to an improvement in canister-pails used for holding teas and spices; and consists in forming the tops of the pails in such a manner that a handle or bail can be secured to them without the use of ears, and which will lie or rest upon a shoulder formed around the top of the can, within its circumference, so as to be entirely out of the way.

In the accompanying drawing, Figure 1 is a perspective of my invention. Fig. 2 is a section of the same.

A represents a tea or spice canister, which has a shoulder, D', formed around its top, and a raised slanting portion, D, upon the top of which is placed the cover B. Through the raised portion D are two small openings, through which the ends of bail C are passed and secured in any suitable manner. This bail should be just long enough when lying down to rest upon the shoulder D' without projecting beyond the edges, and thus be entirely out of the way, taking up no extra room in packing, and be secured from being crushed or broken, and which will enable the canister to be used as a bucket and for other household purposes after the spices have been used or taken out.

By this simple device canisters which otherwise would be useless, except for sitting on the shelf, can be adapted to every conceivable use.

I am aware that bails have been secured to pails of all descriptions, and do not, therefore, claim broadly securing one to a canister; but What I do claim as new, and desire to secure by Letters Patent, is—

The pail A, having the shoulder D' formed around its top, and the raised portion D, and the bail C hooking into it, the shoulder and bail being so arranged in relation to each other that the bail will fall and rest within the circumference of the top of the pail, as shown and described.

CHARLES A. MURDOCK.

Witnesses:
J. B. SMITH,
H. B. SHERMAN.